July 21, 1936. O. A. LARSEN 2,047,971
FLEXIBLE AUTOMOBILE SUPPORT
Filed Oct. 14, 1933
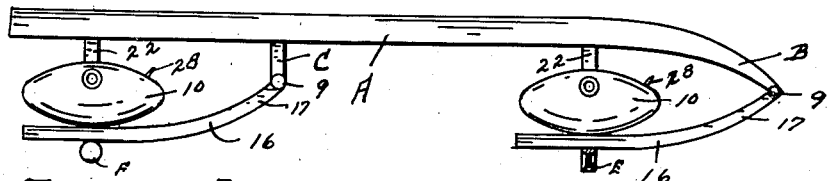
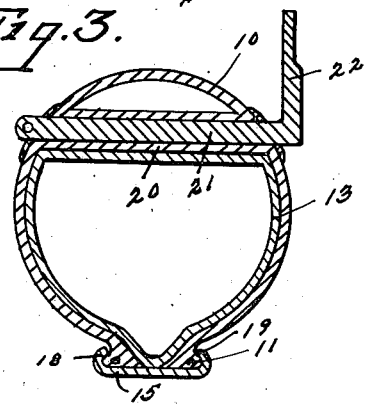
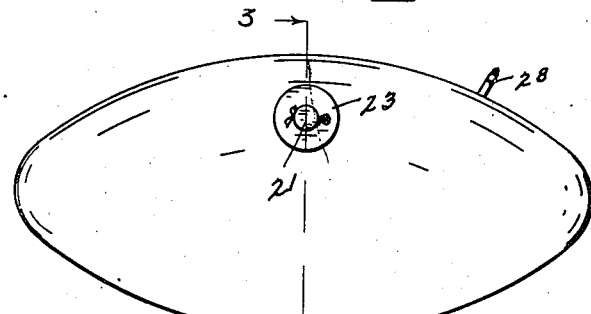
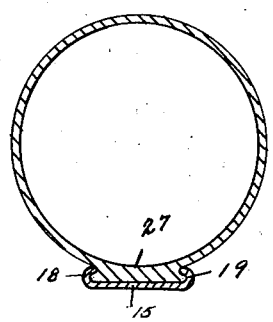
Inventor
Ole Alonzo Larsen
By R. M. Thomas
Attorney Patented July 21, 1936

2,047,971

UNITED STATES PATENT OFFICE 2,047,971

FLEXIBLE AUTOMOBILE SUPPORT

Ole Alonzo Larsen, Salt Lake City, Utah, assignor of twenty-four and one-half per cent to Dallas J. Larsen, Salt Lake City, Utah Application October 14, 1933, Serial No. 693,666

1 Claim. (Cl. 267—35)

My invention relates to automobiles and has for its object to provide a new and efficient elliptical shaped or egg shaped air chamber to be used to support the automobile body above the axles and wheels, to replace the springs as now used.

A still further object is to provide an air bag of correct form, and carrying sufficient air pressure to cushion the weight of the automobile body, giving the passenger greater smoothness in traveling.

A still further object is to provide a set of air bags for use in place of the conventional spring, to take the weight of the body and give greater riding ease with less shocks to the body, thereby giving greater life to the automobile body.

A still further object is to provide a set of air bags to replace the conventional springs now used on automobile bodies, these bags to be filled to any desired pressure by the person riding in the automobile, so that they may regulate the amount of rebound and give to the support, thus providing adjustable riding quality for automobiles heretofore never possible, giving the passenger the effect of riding upon air.

A still further object is to provide an air bag which may be used either to replace the conventional springs or used in conjunction therewith as a shock absorber and rebound check and increase the riding qualities of the automobile.

These objects I accomplish with the device illustrated in the accompanying drawing in which similar numerals and letters of reference indicate like parts throughout the several views and as described in the specification forming a part of this application and pointed out in the appended claim.

In the drawing

Figure 1 is a side elevation of an automobile frame, wheels removed, and parts cut away to show the air bag support for the body to the axles.

Figure 2 is an enlarged side elevation of the air bag and a section of the channel support therefor.

Figure 3 is a section on line 3—3 of Figure 2.

Figure 4 is a section of the top of the air bag to show another means of securing the bag to the frame of the body.

Figure 5 is a cross section of the air bag and rim with no inner tube used therein.

In the drawing I have shown the frame of the body as A, having the front end curved down at B and having a vertical rear support C secured thereto. Each side of the frame and each of the ends of the frame are supported on air bags 10 having the base of each bag formed with beading 11 therein around a central opening 12 on the bottom side of the bag with a bag or tube 13 carried within the bag and inserted through the opening 12 by which the bag may be inflated. The beading 11 is fitted into a channel 15 in the lever support members 16 which members are pivotally secured by the curved ends 17 to the curved end B and the support C by the pivots 9. The members 16 are formed as channels with the edges 18 and 19 curved upwardly and inwardly similar to the rim of an automobile tire. Across the top of the bag there is a cylindrical member 20 in which the pivot bar 21 is carried. The top end 22 of the pivot bar 21 is secured to the frame A to support the frame on the air bag.

A modified form of attaching the bag to the pivot bar is shown in Figure 4, where an extension 25 is formed in the top of the bag 10 and a hole 26 is provided therethrough through which the pivot bar may be passed and secured. The support members are secured rigidly to the axles E and F of the automobile and with each movement of the axle the air bag is flexed either up or down. An air filling tube 28 is passed through the bag 10 by which it may be filled with air and the tube will be provided with the conventional air valve therein to prevent loss of pressure in the air bags.

As will be obvious, the air bags 10 may be made solid along the bottom edge 27 instead of having the slot or opening 12 therein, as shown in Figure 5, so that the bag may be filled with air if desired and no inner tube used therein.

The material of which the bag is made is obviously not important as any flexible material having sufficient strength and flexibility may be used, such as rubber, leather or combination fabrics.

The placing of positions of the air bags on the channels is not essential to the invention, for in various conditions they may be shifted to fit the type of automobile on which they are being placed and they may even be used in pairs along a single channel support, or they may be used transversely across the front, or rear of an automobile to act as a shock absorber. Such deviations from the methods shown in the drawing do not depart from the spirit of the invention nor the scope of the claim.

The operation of the device is obvious.

Having thus described my invention I desire to secure by Letters Patent and claim:—

In a device of the class described, the combination of an automobile body frame; axles supported from said frame by lever members; said lever members being formed as channels with one end pivotally mounted to said frame; an air bag having a beaded opening through the bottom side thereof with flanges formed thereon to fit said channels; an inner tube for inflating said bag; a cylindrical member formed through said bag; a pivot bar secured to the frame with the end passed through the cylindrical member of the bag to support the frame of the automobile upon the bag yieldingly in either direction.

OLE ALONZO LARSEN.